2,964,053
SHUT-OFF VALVE

Lawrence B. Lynn, Pittsburgh, Pa., assignor, by mesne assignments, to the United States of America as represented by the Secretary of the Army Filed Apr. 25, 1957, Ser. No. 655,164

6 Claims. (Cl. 137—109)

The invention relates to a shut-off valve especially of the type employed with a fluid accumulator.

Most regulated pressure hydraulic systems include an accumulator of relative high capacity in order to provide optimum pump diversity. However, when operating into an open center control circuit having an intermittent duty cycle, the large accumulator of the supply system presents several problems, such as there will be an appreciable delay at the start of the operating cycle before regulated pressure is reached as the accumulator must first be charged, and also at the termination of a cycle the effective operating pressure created by the accumulator persists for a considerable time after the pump or fluid pressure source has been shut off.

It is thus an object of the invention to design a valve which will hold the regulated pressure within the accumulator at the termination of the operating cycle, closing off the accumulator from the load system and the pump, yet automatically interconnect pump, accumulator and load system during the operating cycle.

Another object of the invention is to produce a shut-off valve for use with an accumulator which utilizes the pressure of the accumulator to hold the valve elements closed.

Yet another object of the invention is to design a shut-off valve which is automatically functioning, economical to produce, and provides low resistance to fluid flow.

These and other objects of the invention will become apparent when the invention is considered in respect to the following specification and drawing wherein.

Figure 1:
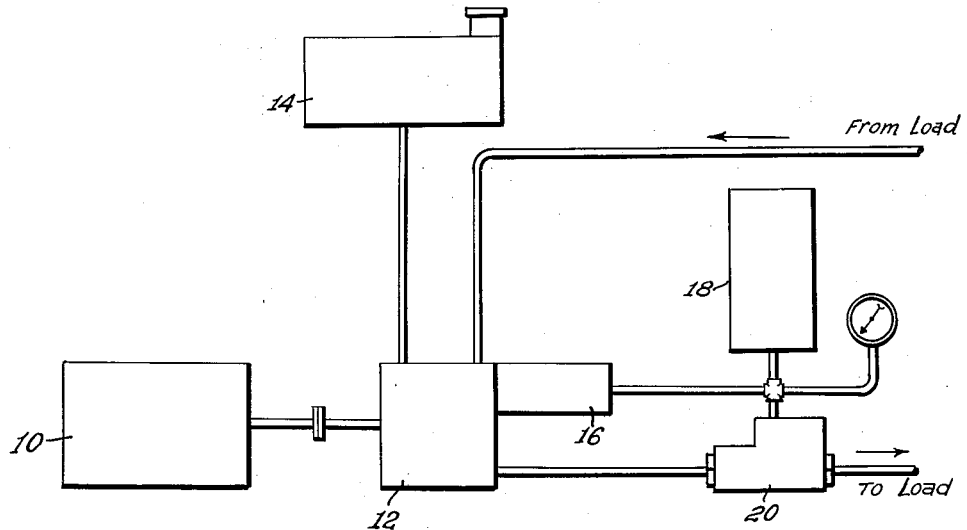
Fig. 1 is a schematic view of a typical regulated hydraulic system with which the invention may be used.

The valve of the invention may be used in any type hydraulic system employing an accumulator such as the typical system disclosed in Fig. 1, however the invention is not limited to any particular fluid circuit.

Fig. 1 discloses a motor 10 driving a pump 12, which supplys fluid under pressure to the load. The pump 12 is supplied from a reservoir 14, as is conventional, and from a return line from the load. A regulator 16 is connected to pump 12 to regulate the pressure of the system and is responsive to the pressure within accumulator 18. The automatic shut-off valve 20 of the invention interconnects the pump with the accumulator and the load completing the control circuit.

Figure 2:
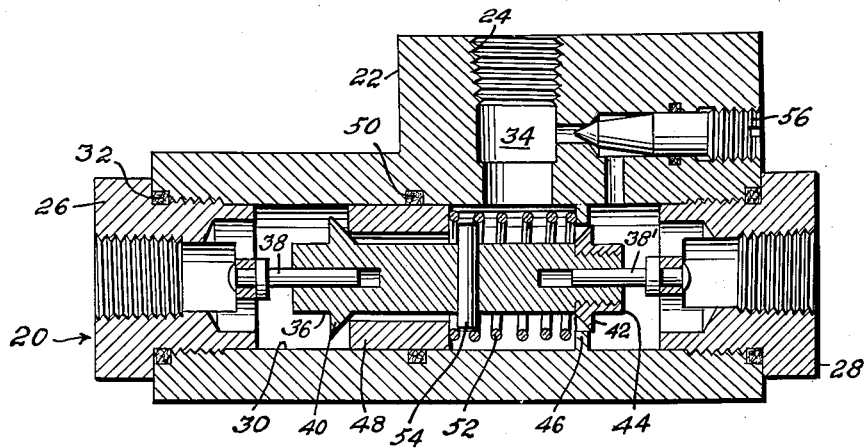
Fig. 2 is a cross-section elevational view of the invention.

Valve 20 is shown in detail in Fig. 2 and consists of a body 22, which is provided with means for connecting the pump, accumulator and load thereto. The conduit leading to the accumulator is threaded into orifice 24 while the pump connection threads into bushing 26 and the load conduit is threaded into bushing 28. Valve 20 is provided with a bore 30 into which bushings 26 and 28 are threadedly affixed and sealed by means of gaskets 32. It will be noted that orifice 24 communicates with bore 30 through passage 34.

The valve spool 36 is located within bore 30 for reciprocation therein and is supported by pins 38 and 38¹ which extend from bushings 26 and 28 respectively and slidingly engage axial bores within the ends of spool 36. A valve head 40 is formed integral with spool 36, adjacent one end thereof, and a second valve head 42 is affixed to the other end by a nut 44. A portion of valve body 22 extends into bore 30 forming a shoulder 46 which acts as the seat for head 42. A tubular sleeve 48 slidingly engages the wall of bore 30 and is sealed thereto by the seal 50. The end of sleeve 48 will engage valve head 40 acting as the valve seat thereof. As will be observed in Fig. 2, the sleeve 48 is biased to the left by a spring 52 co-acting against shoulder 46, and a pin 54 is carried by spool 36 to limit the relative movement between the sleeve 48 and spool 36.

A needle valve 56 is also located in body 22 and is associated with suitable passage ways such that the valve head 42 may be bypassed; the purpose of this construction will be explained later.

The operation of the valve 20 is as follows:

Before the system is charged with fluid pressure, the pressure at all three ports of the valve 20 will be equal, and thus the spring 52 will hold the parts of the valve in the position shown in Fig. 2. As the sleeve 48 is biased to the left, engagement with head 40 will also tend to move spool 36 to the left seating heads 40 and 42. Needle valve 56 will normally be in closed position.

When the pump is actuated and fluid pressure is introduced into bore 30 through bushing 26, the force exerted on spool 36 will overcome the spring biasing action and move spool 36 to the right until the spool 36 engages the shoulder on pin 38¹ preventing further movement, thus valve head 42 will be opened. Once spool 36 has stopped its motion to the right, fluid pressure on sleeve 48 will move sleeve 48 further to the right unseating valve head 40 and permitting fluid to flow through valve 20 into the accumulator and load system. Once the proper pressure has been achieved in the accumulator, the accumulator will absorb surges of the pump, supply pressure to the load during decrease in pump output and provide optimum pump diversity. It will be apparent that, during operation of the pump, both valve heads 40 and 42 will be open thereby placing the pump, accumulator and load in simultaneous fluid connection.

When the pump is stopped, the fluid pressure at orifice 24 and bushings 26 and 28 will equalize, and spring 52 will move sleeve 48 and valve spool 36 to the left, closing valve heads 40 and 42. Immediately thereafter, because of pump leakage and load drain, the pressure at bushings 26 and 28 will drop to system ambient. The accumulator will maintain the pressure within passage 34 and the spring cavity of bore 30 at the regulated pressure. This pressure will act upon the differential area between head 40 and sleeve 48, biasing the same to the left, and augment the spring pressure in maintaining the valve heads 40 and 42 closed, retaining the pressure within the accumulator.

Therefore, the accumulator will be charged with the proper fluid pressure at all times and will function in all subsequent cycles immediately upon restarting of the pump to maintain a constant system pressure and optimum pump diversity. Thus, any lag produced by waiting for the accumulator to reach the operating pressure is eliminated. Should it be desired to unload the accumulator for servicing, the needle valve 56 may be opened, permitting the fluid to bypass valve head 42 into the load system.

It will thus be apparent that the invention discloses an automatic shut-off valve which will retain the pressure within the accumulator. Tests have proven the valve will seal an accumulator for 100 hours at 1250 p.s.i. pressure with no detectable loss, eliminating time lags due to charging and automatically open upon actuation of the pump and automatically close at the end of pump operation preventing surges or dissipation of the accumulator charge into the load. Efficient sealing action is insured as the valve design utilizes the accumulator pressure to help hold the valves shut, and the use of poppet type valve heads permits low flow resistance characteristic.

It will be understood that various modifications to the disclosed embodiment may be apparent to those skilled in the art without departing from the spirit and scope of the invention as defined by the following claims.

I claim:

1. An automatic shut-off valve comprising, in combination, a body, a bore extending through said body, a first inlet port and an outlet port located at the ends of said bore, a valve spool slidably positioned in said bore, a pair of spaced valve heads carried by said spool, a fixed valve seat within said bore for co-operation with one of said valve heads, a movable valve seat within said bore for engagement with the other valve head, means biasing said movable valve seat toward said other valve head, a second inlet port in communication with the bore intermediate of said valve heads, and means for limiting movement of said spool within said bore whereby pressurized fluid introduced into said first inlet port will cause valve heads to unseat and pressurized fluid introduced within said second inlet port will tend to seat said valve heads.

2. In an automatic shut-off valve for use with an accumulator comprising, in combination, a body member, a bore extending through said body member, a first inlet port and an outlet port located at the ends of said bore, a valve spool reciprocally supported within said bore, a pair of spaced valve heads carried by said spool, a fixed seat located within said bore for cooperation with one of the valve heads, a movable seat within said bore engageable with the other of said valve heads, means biasing said movable seat toward said other of said valve heads, stop means limiting movement of said valve spool in said bore, and a second inlet port adapted to be connected to an accumulator in communication with said bore intermediate said valve heads, said valve heads and seats being positioned in a relationship such that fluid pressure introduced at said first inlet will tend to unseat said valve heads and seats and fluid pressure introduced at said second inlet port will tend to close said valve heads and seats.

3. An automatic shut-off valve for use with an accumulator comprising, in combination, a body, a bore extending through said body, a first inlet port and an outlet port located at the ends of said bore, a valve spool slidably positioned within said bore, a pair of spaced valve heads carried by said spool, a fixed valve seat formed in said bore engageable with one of said valve heads, a sleeve slidable within said bore and engageable with the other of said valve heads constituting a movable valve seat, means biasing said sleeve toward said other of said valve heads, stop means limiting slidable movement of said valve spool in said bore, and a second inlet port adapted to be connected to an accumulator and in communication with said bore intermediate of said valve heads whereby fluid pressure introduced within said first inlet port will tend to open said heads and seats and the pressure of the accumulator will tend to close said heads and seats.

4. An automatic shut-off valve for use with an accumulator comprising, in combination, a body, a bore extending through said body, a first inlet port and an outlet port located at the ends of said bore, a valve spool reciprocally positioned in said bore, a valve head formed on said valve spool, a valve head removably mounted on said valve spool, a valve seat formed in said bore engageable with said removable valve head, a sleeve slidably positioned in said bore and engaging the walls thereof, said fixed valve head being engageable with said sleeve forming a valve seat, stop means limiting movement of said valve spool in said bore, a second inlet port adapted to be connected to an accumulator communicating with said bore intermediate said valve heads and means biasing said sleeve toward said fixed valve head.

5. In a shut-off valve as in claim 4 wherein a needle valve and passages are located in said body and provide a direct fluid connection between said second inlet port and said outlet port.

6. An automatic shut-off valve comprising, in combination, a body, a bore extending through said body, a first inlet and an outlet port located at the ends of said bore, a valve spool slidingly positioned in said bore, a second inlet port communicating with said bore intermediate of said valve spool, a valve head fixed to said valve spool between said first and second inlet ports, a removable valve head attached to said spool between said second inlet port and said outlet port, stop means limiting movement of said valve spool, a valve seat formed in said bore engageable by said removable valve head, a sleeve valve seat slidable within said bore engaging the wall thereof positioned between said fixed valve head and said second inlet port, and means biasing said sleeve valve seat toward said fixed valve head, whereby fluid pressure introduced into said second inlet port will tend to move said sleeve towards engagement with said fixed valve head.

References Cited in the file of this patent
UNITED STATES PATENTS

| 1,407,844 | Dewey | Feb. 28, 1922 |
| 2,764,175 | Mercier | Sept. 25, 1956 |

FOREIGN PATENTS

| 706,328 | Great Britain | Mar. 31, 1954 |